US012008924B2

(12) United States Patent
Riffel et al.

(10) Patent No.: US 12,008,924 B2
(45) Date of Patent: Jun. 11, 2024

(54) METHOD OF ATTACHING A DIFFUSER TO AN ILLUMINATED SIGN

(71) Applicant: SIGNIFY HOLDING B.V., Eindhoven (NL)

(72) Inventors: Robert John Riffel, Saltillo, MS (US); Gary Lauderdale, Shannon, MS (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 68 days.

(21) Appl. No.: 17/617,919

(22) PCT Filed: Jun. 10, 2020

(86) PCT No.: PCT/EP2020/066025
§ 371 (c)(1),
(2) Date: Dec. 9, 2021

(87) PCT Pub. No.: WO2020/249586
PCT Pub. Date: Dec. 17, 2020

(65) Prior Publication Data

US 2022/0309966 A1 Sep. 29, 2022

Related U.S. Application Data

(60) Provisional application No. 62/860,006, filed on Jun. 11, 2019.

(30) Foreign Application Priority Data

Jul. 4, 2019 (EP) .................................... 19184360

(51) Int. Cl.
*G09F 13/04* (2006.01)

(52) U.S. Cl.
CPC ...... *G09F 13/0409* (2013.01); *G09F 13/0458* (2021.05); *G09F 2013/05* (2021.05)

(58) Field of Classification Search
CPC ............. G09F 13/0409; G09F 13/0458; G09F 2013/05; G09F 13/06; G09F 13/00;
(Continued)

(56) References Cited

U.S. PATENT DOCUMENTS 1,792,135 A * 2/1931 Zieman .................. G09F 13/14 40/615
3,931,689 A * 1/1976 Shine ...................... G09F 13/06 40/570

(Continued)

FOREIGN PATENT DOCUMENTS

CN 1639507 A 7/2005
CN 204756566 U 11/2015

(Continued)

*Primary Examiner* — Cassandra Davis

(57) ABSTRACT

The invention relates generally to illuminated signs (100) having multiple point light sources such as light emitting diode arrays as the illumination source for legend-bearing face panels and particularly to diffuser structure mountable in relation to such an array for facilitating an even distribution of light within such a sign to improve illumination of the typically translucent legend disposed on such a face panel. In particular, the invention employs a clear diffuser holder (120) that is secured to the inside surface of el the face panel thereby providing a means of removeably attaching a diffuser (130). The invention permits interchangeably employing diffusers of different colors while providing resistance to vandalism.

11 Claims, 2 Drawing Sheets

(58) Field of Classification Search
CPC .......... G09F 13/04; G09F 13/22; F21V 3/049; F21V 3/0615; F21V 3/0625; F21V 17/002; F21V 17/104; F21V 9/00; F21V 19/08; F21V 19/083
See application file for complete search history.

(56) References Cited

U.S. PATENT DOCUMENTS

| | | | | |
|---|---|---|---|---|
| 4,383,382 | A | 5/1983 | Hegarty | |
| 5,365,411 | A | 11/1994 | Rycroft et al. | |
| 5,539,623 | A | 7/1996 | Gurz et al. | |
| 5,729,925 | A * | 3/1998 | Prothero | G09F 13/04 362/800 |
| 5,953,842 | A | 9/1999 | Bodell | |
| 6,050,013 | A | 4/2000 | Heaton et al. | |
| 6,152,581 | A | 11/2000 | Masters et al. | |
| 6,539,657 | B1 | 4/2003 | Qualls, Jr. et al. | |
| 2007/0236941 | A1 | 10/2007 | Logan et al. | |
| 2011/0210861 | A1 | 9/2011 | Winton et al. | |
| 2016/0148472 | A1 | 5/2016 | Hsu | |
| 2018/0144668 | A1 | 5/2018 | Gow | |

FOREIGN PATENT DOCUMENTS

| | | | |
|---|---|---|---|
| CN | 207097404 | U | 3/2018 |
| KR | 101505822 | B1 | 3/2015 |
| WO | 2017061852 | A1 | 4/2017 |

* cited by examiner

METHOD OF ATTACHING A DIFFUSER TO AN ILLUMINATED SIGN

CROSS-REFERENCE TO PRIOR APPLICATIONS

This application is the U.S. National Phase application under 35 U.S.C. § 371 of International Application No. PCT/EP2020/066025, filed on Jun. 10, 2020, which claims the benefit of U.S. Provisional Patent Application No. 62/860,006, filed on Jun. 11, 2019, and European Patent Application No. 19184360.6, filed on Jul. 4, 2019. These applications are hereby incorporated by reference herein.

FIELD OF THE INVENTION

The invention relates generally to illuminated signs having multiple point light sources such as light emitting diode arrays as the illumination source for legend-bearing face panels and particularly to a diffuser structure mountable in relation to such an array for facilitating an even distribution of light within such a sign to improve illumination of the typically translucent legend disposed on such a face panel. In particular, the invention employs a clear diffuser holder that is secured to the inside surface of the face panel thereby providing a means of removeably attaching a diffuser. The invention permits interchangeably employing diffusers of different colors while providing resistance to vandalism.

BACKGROUND

Illuminated signs and particularly exit signs are commonly employed in commercial and industrial situations as well as in multi-unit residential buildings primarily for exit identification. Such signage takes many forms with interior illumination being provided through the use of a variety of illumination sources, an illumination source of particular utility in these energy conscious times being light emitting diodes which require greatly reduced power expenditures for operation. In order to overcome the low light generating capability of presently available light emitting diodes, various approaches have evolved including the use of a relatively large number of spaced apart light emitting diodes in various arrangements or arrays for providing the necessary candle power for satisfactory illumination of the interior of an exit sign such that the legends on face walls of such signs are evenly illuminated according to code requirements or any other reasonable standard of acceptability. Such arrangements typically use a diffuser material that is placed between the light emitting diodes and the legend sheet or plate. Such an illumination sign is described in U.S. Pat. No. 6,152,581, hereby incorporated by reference.

The present invention intends improvement upon the prior art by providing a diffuser holder arrangement which permits diffusers of different colors to be interchangeable positioned in the illuminated sign. Further, the diffuser holder arrangement of the present invention helps prevent vandalism to such an illuminated sign by precluding the insertion of foreign objects or other types of tampering.

SUMMARY OF THE INVENTION

In various embodiments of the present invention, a clear diffuser holder is formed which possesses a 180° return at two of its opposite edges. The diffuser holder is secured to the inside surface of the legend-bearing face panel of an illuminated sign. Such an illuminated sign is typically employed as an exit sign and thus the face panel or stencil typically says “EXIT.” In the discussion below, the phrases “EXIT sign” and “EXIT” stencil will be employed for simplicity although the invention is not so limited, as other types of illuminated signs are contemplated by the invention.

In various embodiments of the invention, the clear diffuser holder is typically formed of plastic and may be attached to the EXIT stencil by mechanical means such as fasteners or by heat staking plastic pins that are molded as part of the EXIT stencil where they pass thru holes in the clear diffuser holder. The clear diffuser holder provides a means of attachment for the red or green diffuser sheet and also provides resistance to vandalism. That is, by way of example, the red or green diffuser sheet cannot be pushed into the product from outside the product. The 180° return edges engage with the edges of a colored diffuser sheet, which is typically red or green in color. In this manner, the colored diffuser sheet is held tight against the inside surface of the clear diffuser holder.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings.

DETAILED DESCRIPTION OF PREFERRED EMBODIMENTS

Figure 1A:
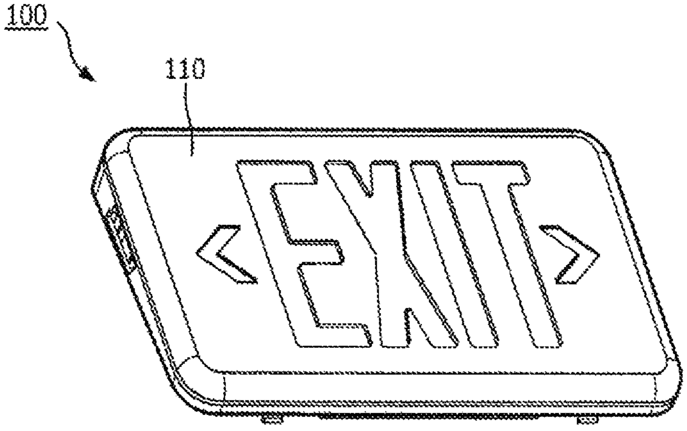
FIG. 1A shows a perspective view of an assembled illuminated exit sign in accordance with the present invention.

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1B:
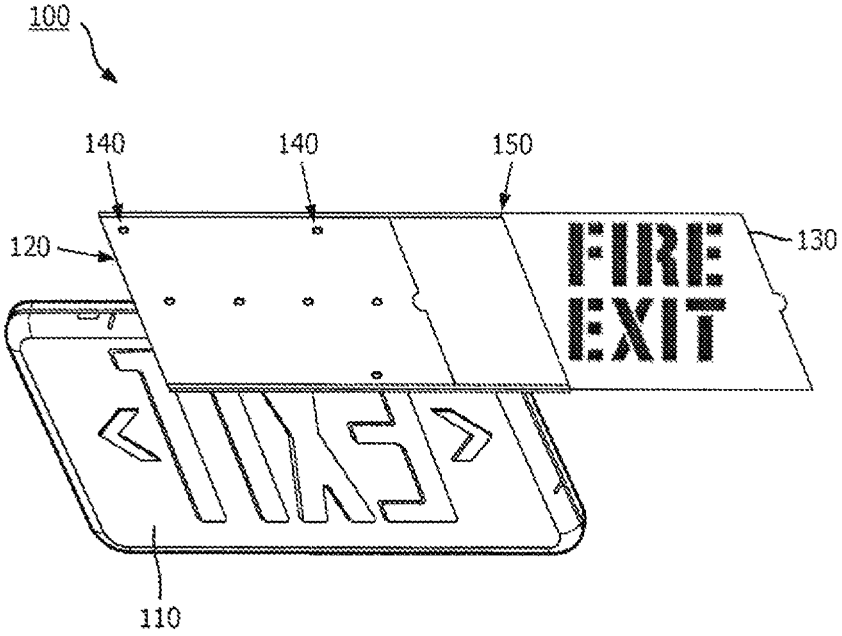
FIG. 1B shows an exploded perspective view, illustrating the primary components of the inside of an illuminated exit sign that is configured according to a particular embodiment of the invention; and, FIGS. 2A-2C illustrate various perspective views and corresponding dimensions of an exemplary diffuser holder according to the invention.

FIG. 1A shows an illuminated sign 100 in accordance with one embodiment of the present invention. FIG. 1B shows an exploded perspective view illustrating the primary components of the illuminated exit sign 100. These components include a separate and removable diffuser holder 120 and a diffuser sheet 130. In various embodiments of the invention, the diffuser holder is formed from clear plastic, while the diffuser sheet would be colored (e.g., red or green). The diffuser holder 120 is tightly attached to the EXIT stencil 110 by mechanical means such as fasteners or by heat staking plastic pins (not illustrated) that are molded as part of the EXIT stencil. In the embodiment illustrated in FIG. 1B, these staking means mate with pass-thru holes 140 in the diffuser holder 120. Once assembled, the diffuser holder 120 provides a means of attachment of the diffuser sheet 130 to the illuminated sign 100. That is, as depicted in FIG. 1B, the 180° return edges of the diffuser holder 120 form channels 150 that engage two opposing edges of the diffuser sheet 130. In this manner, the diffuser sheet 130 is held tight against the inside surface of the clear diffuser holder 120.

It should be noted that the diffuser holder 120 also provides resistance to vandalism. That is, as the diffuser holder is securely attached to the inside of the stencil face, it prevents foreign objects from being pushed through the character "openings" in the stencil and into the interior of the sign—as such foreign objects are precluded from passing through or around the diffuser holder.

Figure 2A:
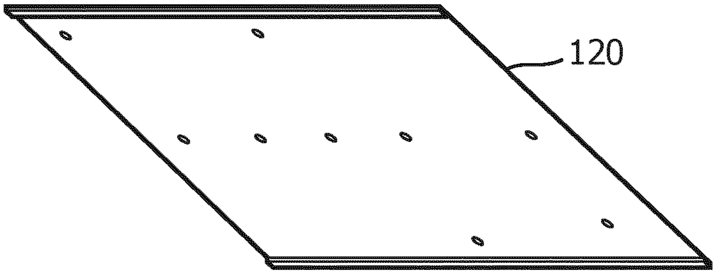
Figure 2B:
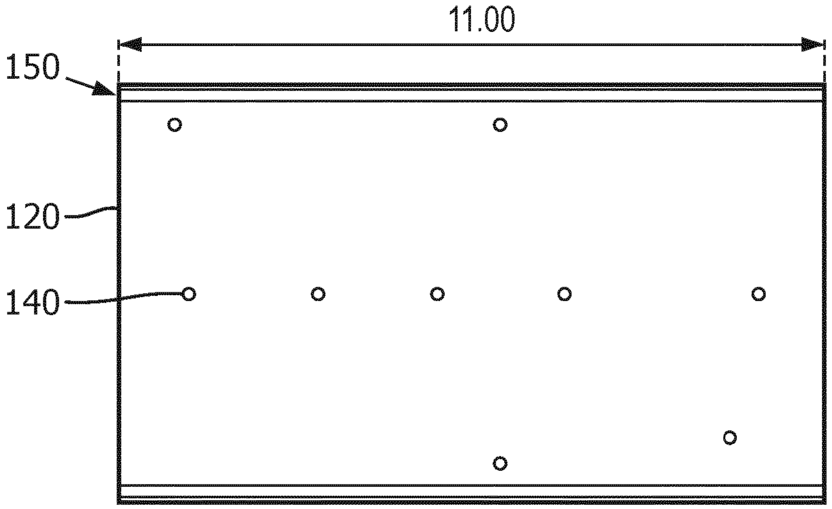
Figure 2C:
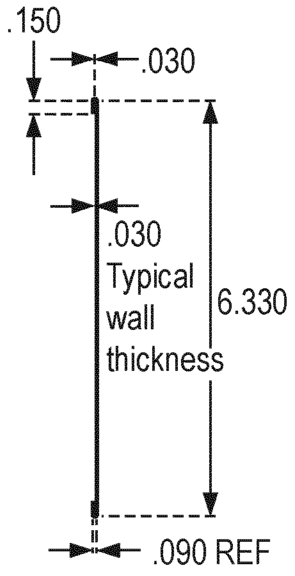

FIGS. 2A-2C illustrate various perspective views and corresponding dimensions of an exemplary diffuser holder according to the invention. As illustrated, the diffuser holder is 11.00" long and 6.33" wide, which width included opposed channels each being 0.150" wide. In a preferred embodiment of the invention, the actual channel openings provide a gap of 0.030" to accommodate insertion and secure retention of a diffuser sheet having a thickness of 0.018". These dimensions are not limiting. That is, by way of further examples, diffuser sheets are typically 0.010" to 0.030" thick and made of rigid materials like polycarbonate sheet. Thus, in additional embodiments, a channel gap opening would be provided with the appropriate size gap to accommodate insertion of the thickness of the diffuser sheets to be employed.

In additional embodiments of the invention, the face panel of the illuminated sign does not contain a stencil. Rather it comprises a transparent or translucent, solid cover. In these embodiments, the wording or indicia typically found on the stencil is instead provided on the diffuser sheet which is to be inserted into the diffuser holder. Accordingly, the wording/indicia displayed on the sign can be readily changed (e.g., the word "EXIT" can be changed to "SALIDA"). In such embodiments, the solid cover can also function as a diffuser. Further, the solid cover and/or the diffuser sheet can provide color to the output of the illuminated sign.

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components (devices, systems, and the like), the terms (including a reference to a "means") used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

The invention claimed is:

1. An illumination sign having an interior, an internal light source and a face panel having an interior side, the illumination sign comprising:

a stencil defining openings that form a symbol or letters viewable by an observer;

a diffuser holder attached to the interior side of the face panel and juxtaposed to the stencil, wherein in use a diffuser sheet is attached to and held tightly against the diffuser holder wherein the diffuser holder comprises opposed channels for permitting the diffuser sheet to be inserted and thereby securely held against the diffuser holder, and wherein the diffuser holder is made of a clear material that creates a barrier that prevents foreign objects from being inserted through the stencil openings and into the illumination sign interior.

2. The illumination sign according to claim 1, wherein the diffuser holder comprises pass-thu holes that mate with heat staking pins molded on the interior side of the face panel.

3. The illumination sign according to claim 1, wherein the diffuser holder is clear in color.

4. The illumination sign according to claim 1, wherein the diffuser sheet is red or green in color.

5. The illumination sign according to claim 1, wherein said symbol is the word EXIT.

6. The illumination sign according to claim 1, wherein said symbol further includes a directional arrow.

7. The illumination sign according to claim 1 wherein the diffuser holder is removably attached to the interior side of the face panel;

wherein the face panel is transparent or translucent;

wherein the diffuser sheet comprises symbols or language intended to be displayed on the illumination sign.

8. A method for removably attaching a diffuser sheet to an illumination sign, the illumination sign having an interior, an internal light source, a face panel having an interior and an exterior side, and a stencil juxtaposed to the face panel, the stencil defining openings that form a symbol or letters, the method comprising the steps of:

removably attaching a diffuser sheet holder to the interior side of the face panel, wherein the diffuser sheet holder comprises opposed channels, wherein the diffuser sheet holder is made of a clear material and creates a barrier that prevents foreign objects from being inserted through the stencil openings and into the illumination sign interior; and inserting the diffuser sheet into said channels, thereby securely holding the diffuser sheet against the diffuser holder.

9. The method of claim 8, wherein the step of removably attaching comprises providing heat staking pins on the interior side of the face panel which mate with pass-thru holes contained on the diffuser holder.

10. The method of claim of claim 8, wherein the face panel is transparent or translucent, and the method further comprises providing on the diffuser sheet, symbols or language intended to be displayed on the illumination sign.

11. The method of claim 8, further comprising a step of providing one or more colors to the diffuser sheet.

* * * * *